United States Patent [19]

Bergquist

[11] Patent Number: 4,891,693
[45] Date of Patent: Jan. 2, 1990

[54] REFERENCE MARKING DEVICE FOR IMAGE TRANSMITTERS

[75] Inventor: Folke Bergquist, Hindås, Sweden

[73] Assignee: Victor Hasselblad AB, Göteborg, Sweden

[21] Appl. No.: 131,891

[22] Filed: Dec. 11, 1987

[30] Foreign Application Priority Data

Dec. 11, 1986 [SE] Sweden ............................... 8605306

[51] Int. Cl.⁴ .............................................. H04N 1/46
[52] U.S. Cl. ...................................... 358/75; 358/405
[58] Field of Search ................. 358/51, 264, 257, 282, 358/285, 75, 318, 323, 405, 450, 488

[56] References Cited

U.S. PATENT DOCUMENTS

| | | | |
|---|---|---|---|
| 4,081,842 | 3/1978 | Harbaugh et al. | 358/264 |
| 4,254,439 | 3/1981 | Fowler | 358/267 |
| 4,712,139 | 12/1987 | Kato | 358/280 |
| 4,717,966 | 1/1988 | Bergquist | 358/286 |

FOREIGN PATENT DOCUMENTS

| | | | |
|---|---|---|---|
| 0134978 | 8/1984 | Japan | 358/75 |
| 0139062 | 7/1985 | Japan | 358/75 |
| 0199266 | 10/1985 | Japan | 358/75 |

*Primary Examiner*—Edward L. Coles, Sr.
*Assistant Examiner*—Jerome Grant

[57] ABSTRACT

Figure 3:
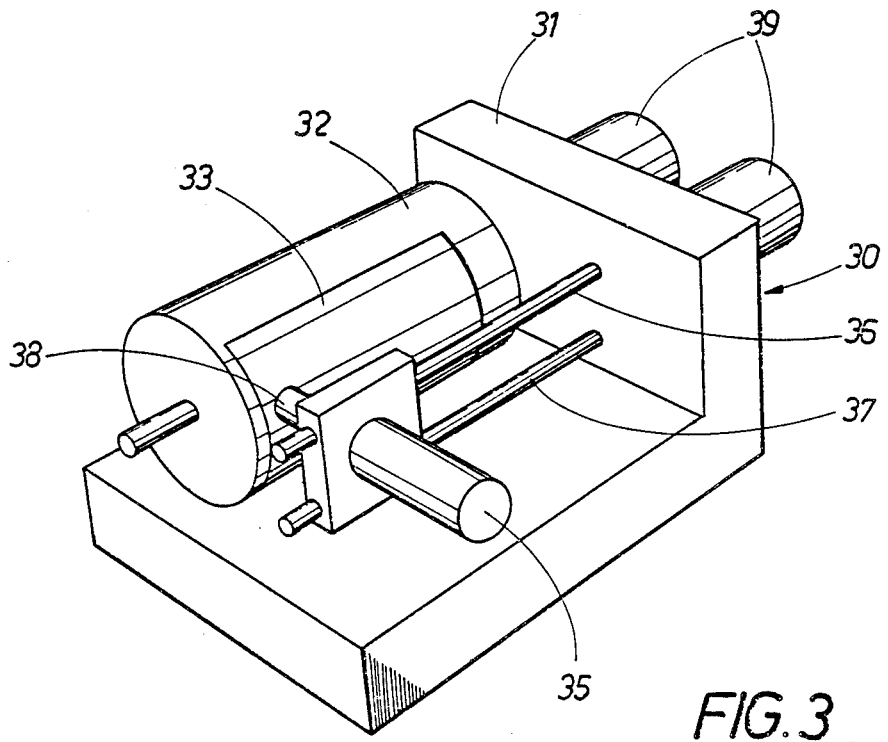

A reference marking device for image transmitters includes a transmitter (FIG. 1) and a receiver (FIG. 3). The transmitter includes a scanner, which optically scans an image, and generates an image signal corresponding to the content of the image. The receiver receives the image signal and records the received image signal on an image base as a reproduction of the scanned image. The image base is provided with reference marks for registration of a series of separate, associated image reproductions, obtained preferably by means of color separation of the scanned image. The transmitter additionally generates and transmits reference signals. A reproduction device, included in the receiver, registers said reference marks in correspondence with the reference signals. The transmitter transmits the reference signals to the receiver in such a manner that, upon repeated scanning of the image, the reference marks are generated in positions which are invariant relative to the content of the series of associated image reproductions.

1 Claim, 5 Drawing Sheets

REFERENCE MARKING DEVICE FOR IMAGE TRANSMITTERS

The present invention relates to a reference marking device for image transmitting devices including a transmitter and a receiver, whereby the transmitter includes a scanner, provided to scan an image optically and to generate an image signal corresponding to the content of the image; the receiver is provided to receive the image signal and to record the received image signal on an image base as a reproduction of the scanned image; the image base is provided with reference marks for registration of a series of separate, associated image reproductions, obtained preferably by means of color separation of the scanned image.

When transmitting an image over a longdistance, a transmitter is used, which scans the image point by point. The points are converted into a transmission signal which is transferred to a receiver. The transmission signal is converted in the receiver to a reproduction of the image points which, during the transmission sequence, are used to build up a reproduction of the image scanned in the transmitter. When transmitting color images it is usual for the image to be separated into, for example, three basic colors. Transmission signals for each of these colors are transmitted one after the other so that the receiver receives a number of images, each one corresponding to one of the colors. These images are then printed together using filters, the colors of which correspond to the colors into which the image was separated upon transmission.

In order for all of the image points for each of the colors to agree in position when being printed together, it is advantageous for the images to be provided with reference marks even before reception, since any displacement will lead to blurring and to color shadows. The reference marks provide an unambiguous indication of how the images are to be positioned relative to one another. If the object to be scanned is a physical image material such as a paper copy, it can be provided with reference marks which are scanned in the same manner as the image itself upon conversion for transmission. However, if a projected image is to be scanned, which is common when working directly from a negative or from a positive slide, it is not suitable to provide the image material itself with reference marks.

The object of the present invention is to provide an apparatus in which reference marks are generated in the scanning device of the transmitter and are integrated into the transmission signal without necessitating any form of preparation of the image material. These reference marks can be reproduced in receiving apparatus in a conventional manner and are added to the received image before further processing.

One embodiment of the invention is shown in the accompanying diagrams.

Figure 1:
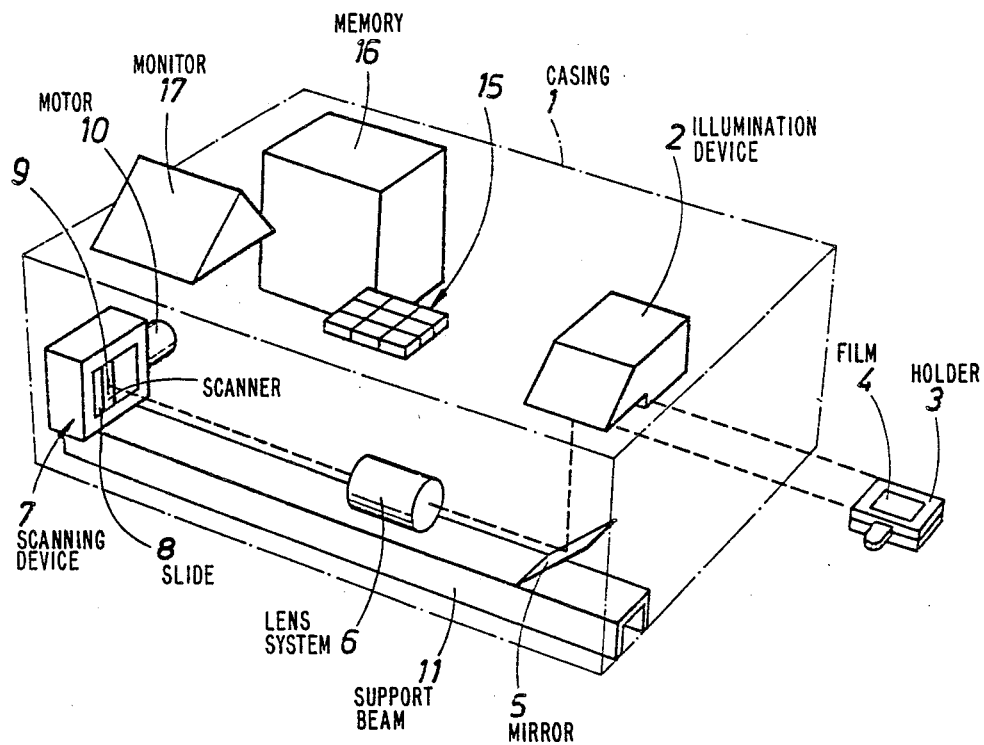
Figure 2:
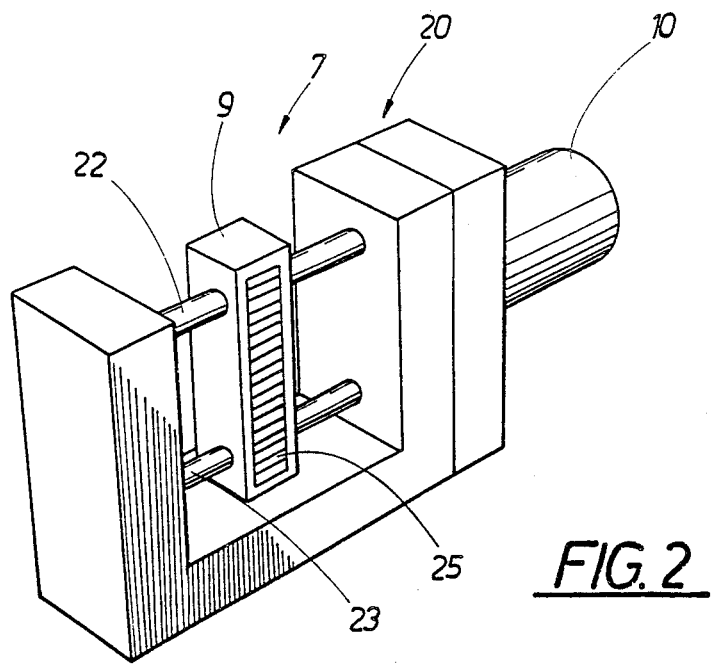
Figure 4:
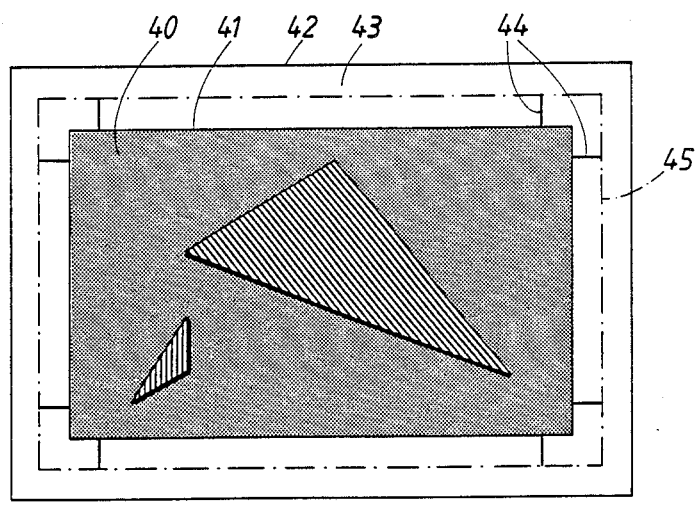
Figure 5:
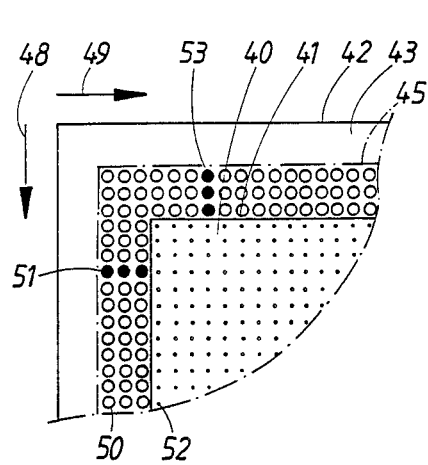
Figure 6:
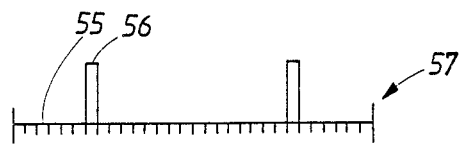
Figure 6:
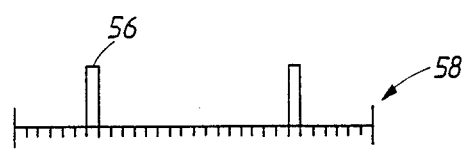
Figure 6:
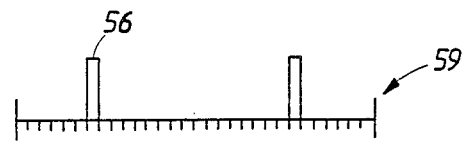
Figure 6:
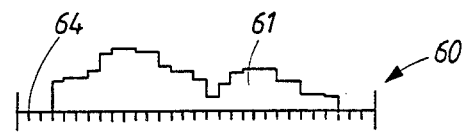
Figure 6:
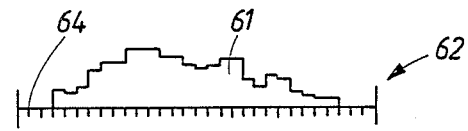
Figure 6:
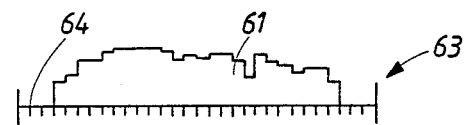
Figure 6:
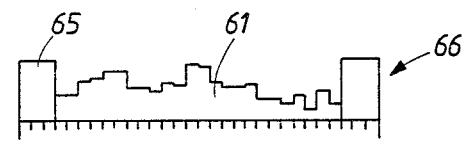
Figure 7:
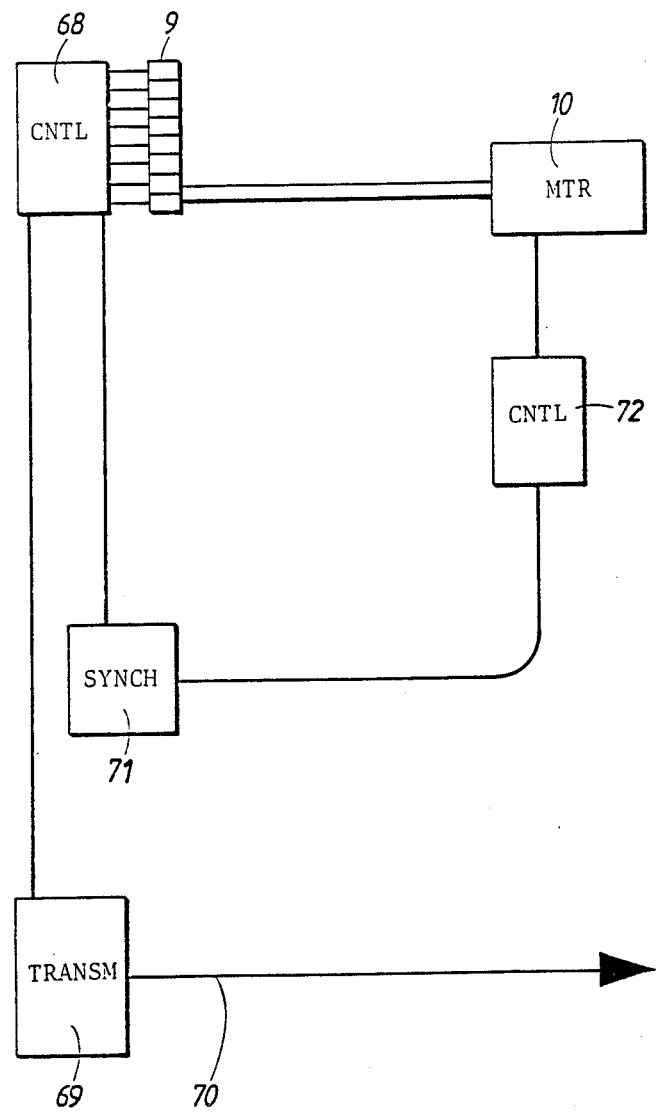

FIG. 1 shows an image transmitter in simplified form;
FIG. 2 shows a scanning device in the transmitter;
FIG. 3 illustrates an image reproduction device;
FIG. 4 shows an image provided with reference marks;
FIG. 5 shows a portion of the image in FIG. 4, resolved into image points;
FIG. 6 shows consecutive portions of a transmission signal in graphic form; and
FIG. 7 shows a block diagram of the transmitter.

An apparatus for transmitting image information of the type for which the invention is applicable is shown in FIG. 1. It includes a casing 1, an illumination device 2, a maneuverable holder 3 for film 4, the holder 3 being placed in the beam path of the illumination device, as well as, on a supporting beam 11, a first mirror 5, a lens system 6, having variable magnification, and an image scanning device 7.

The image scanning device 7 includes a row scanner 9, which, for example, may be of the CCD-type, which is securely mounted on a movable slide 8. The slide 8 is movable in a known manner by means of a motor 10 perpendicular to the longitudinal direction of the row scanner 9 so that the image projected onto the scanning device 7 from the film 4 via the mirror 5 and the lens system 6 can be scanned row by row.

The transmitter is provided with a monitor 17 in order to make possible control of the scanned image, which is stored electronically in a memory 16.

FIG. 2 shows the image scanning device 7 in the transmitter according to FIG. 1. It includes a frame 20 with two guide rods 22 and 23 along which the said row scanner 9 can be moved. The guide rods 22, 23 may, for example, consists of worms, which are turned by the electrical motor 10 in the frame 20, whereupon the row scanner is moved back and forth along the guide rods depending upon the direction of rotation of the worms. The row scanner is provided with a row of photosensors 25, distributed so as to have a fine subdivision. The photosensors are shielded in the transverse direction of the scanner in such a way that they react only to a narrow strip which extends perpendicular to the direction of movement of the row scanner. The plane of the photosensors lies in the focal plane of the said projection of the image which is to be transmitted.

FIG. 3 shows an example of an image reproduction device 30 associated with a receiver. The image reproduction device 30 includes a frame 31 in which a drum 32 is journaled and is provided to support an image base such as photographic paper or photographic film 33. An illumination device 35 is movable on guide rods 36, 37 along the drum 32. It has an optical device 38 which is directed towards the drum and which focuses light from the light source to a fine point on the surface of the paper/film 33. Motors 39 are provided for moving the illumination device along the guide rods 36 and for rotating the drum 32. The motors 39 are mounted on the frame 31 and are connected to control equipment. (For the sake of clarity, only a portion of the frame is shown, whereby one portion is removed.) The light source in the illumination device 35 is provided to receive signals from the transmitter and to modulate the strength of its light in accordance with the signals.

The photosensors of the row scanner 9 are connected to electronic equipment in the transmitter in such a way that they produce a pulse, the amplitude of which corresponds to the strength of the light, which influences each respective photosensor during the moment of registration. This is carried out sequentially along the row.

Since reference marks are mostly generated and used when transmitting color images it is assumed that the transmission and receiving apparatus is intended for such transmission. However, there is no significant difference between apparatuses for transmitting black and white images and apparatuses for transmitting color images since the color images are separated into component color which are sent as separate images. If the original is not separated into colors, filters are required in the transmitter which shift between the transmission of the colors into which the image is separated. This is, however, well known to one skilled in the art and is not described further.

FIG. 4 shows an image having the appearance it has received after reproduction by the receiver. As can be seen in the figure, it has a central region containing the reproduced image 40, the border of which is designated 41. The base upon which the image is reproduced has an outer border which is designated 42. Between the image border 41 and the base border 42 there is a frame region 43, which does not contain any image. Such a frame region is usually white; this is also shown in the figure. A number of reference marks 44 extend from the image border 41. These reference marks are thus located in the frame region 43. A virtual frame 45, shown as a broken line, defines an outer border within which all information on the base is contained, that is to say, the image 40 as well as the reference marks 44.

The transmitter is provided to convey to the receiver a signal which directs the reproduction apparatus of the receiver to build up all of the image elements within the region which is delimited by the line 45, that is, the reference mark 44, the neutral background with no information, the frame region 43 within the line 45, and the image 40 itself. The transmission signal can therefore be considered to be divided into portions, each of which represents a scan line of the image, that is, along the row scanner 9, the image being divided up into the lines by means of sequential movement of the row scanner. In a corresponding fashion, the image is reconstructed in the receiver by moving the reproduction device, the optical device 38, in consecutive lines over the surface of the base. Viewing the image as consisting of the entire surface within the line 45, it may be said that every line of the image is composed of a number of image points.

FIG. 5 illustrates schematically the way in which the image may be divided into such image points. The longitudinal direction of the row scanner, that is, the longitudinal direction of the scan lines, is indicated by the arrow 48. The direction of the successive placement of the lines one after the other, that is, the direction of movement of the row scanner, is indicated by the arrow 49. Most of the image points included in the transmission signal representing the first line, which is designated 50, represent points of the neutral background in the frame region 43. Since it is assumed that the frame region will be white, the transmission signal can, for example, assume its lowest amplitude for the corresponding white image points. Such white image points are indicated by open circles. The nature of the transmission signal must, however, change when reaching the reference marks 44 along the short side of the image. Assuming that the reference marks are given the maximum degree of blackness, the transmission signal will assume its highest amplitude. This is indicated by a blackened circle. Three blackened circles 51 thus designate successive reconstruction, line by line, of the first reference mark on the short side of the image. In accordance with the coarse representation which is used for the sake of clarity in FIG. 5, if one assumes that the region between the line 45 and the image border 41 is covered by three lines, the fourth line 52 will contain information about the structure of the image 40. This is indicated by points within a region which is designated 40. This designation is also used in FIG. 4. At the beginning of the line 52 there is, however, a transmission signal corresponding to the one in the border region at the short side. When scanning, the row scanner will reach the region where the first reference mark along the long side of the image will be placed. The transmission signal must thus have the corresponding amplitude, for example, as was mentioned above, its maximum amplitude, within the frame region, up to the image region 40. This is designated by three blackened circles 53.

In FIG. 6, the signal is shown line by line in graph form. The signal corresponding to the first line 50 is thus shown as having its lowest amplitude along the line segment 55 for the signal portion 57 corresponding to the first part of the frame region and, thereafter, having its highest amplitude in a region 56 which designates the first portion of the first reference mark at 51 in FIG. 5. The graphs for all three of the first lines will have the same form, which is shown in segments 57, 58 and 59. At the line designated 52 in FIG. 5 and represented by the graph portion 60 in FIG. 6, for the central region 40 in FIGS. 4, 5, a modulated signal is created, represented by the region 61 of the curve 60. This region contains the image information proper. This is also the case for graph section 62 and 63, in which information for corresponding image portions is contained. In all of the cases the frame region is neutral, which is designated by the outer region 64 having the lowest amplitude. For the line designated 53 in FIG. 5, the first reference mark along the long side in the frame region must, however, be indicated. This is designated by the end region 65 in the graph 66, which also contains a modulated signal for the image region 40.

It will be understood that the actual modulated image signal (cf. 61 in graph segment 60) is formed by registration by means of a row scanner 9 of the image, which is projected onto the row scanner through the lens 6 (FIG. 1). The frame region and the reference marks in the frame region do not influence the row scanner. As was mentioned initially, the object of the invention is to make it possible to achieve an image in the receiver having reference marks positioned in intended, correct positions without requiring that the original image in the transmitter be provided with such reference marks. In accordance with the invention, the reference marks, along with their background - the frame region - are rather created electronically in the transmitter. This is carried out by means of an electronic counter, which counts the image points during the transmission and, for different positions, directs the transmission signal to assume one of three respective states:

(1) A neutral signal representing the border region 43 which, as been mentioned, is often a signal having the lowest amplitude. The neutral signal corresponds to the graph segments 55 and 64 in FIG. 6.

(2) A signal, which represents the reference mark 44, which contrasts sharply against its background, the border region. This signal will therefore have an amplitude which is the opposite of that of the neutral signal (1); in the assumed case it will thus have the greatest amplitude. This signal corresponds to the graph sections 56 and 65 in FIG. 6.

(3) A signal which corresponds to the light intensity of each respective image point. This represents a modulation of the amplitude of the transmission signal in relation to the output of the respective photosensor in the row scanner. This signal corresponds to the graph segments 61 in FIG. 6.

A neutral frame region as shown is typical. The invention is however, applicable for any reference marks which deviate from their background within a border region of the image itself provided that this region is not included in the completed image.

FIG. 7 shows a block diagram of the principle construction of the device. The row scanner and the driving motor for it are designated 9 and 10, respectively, as before. By means of a controller 68, the light-sensitive elements of the row scanner, that is to say, the photo sensors, are connected sequentially with a transmission device 69 in order to transfer transmission signals to it and transmit them by means of a line 70. Connection of the light-sensitive elements is carried out under the direction of a synchronizer 71 which, via a controller 72, also directs the movement of the row scanner by controlling the motor 10. The synchronizer 71 is thus provided to issue pulses to the controller 68 so that the light-sensitive elements of the row scanner are sequentially connected via the controller 68 to the transmission device 69. When the synchronizer has issued a number of pulses corresponding to the number of image points to be scanned by the row scanner, it issues a control signal to the controller 72, whereupon the motor 10 moves the row scanner one step. Thereafter, the synchronizer once again issues pulses to the controller 68 so that a new row is scanned. In addition to being provided for sequential control of the row scanner and for control of its motion, the synchronizer 71 is also provided to generate pulses of the type described under states (1) and (2) in addition to connecting the row scanner for generation of the signals having state (3). In order to determine which type of signal is to be generated, the synchronizer counts the movement steps during scanning as is indicated in FIG. 6. In the example shown in FIGS. 5 and 6, the synchronizer, for the first six image points of the first line 50, generates signals having state (1). Thereafter, for the seventh image point, a signal is generated having state (2). Beginning with image point eight, the signal is once again generated so as to have state (1). The following two lines are built up in the same way. When the fourth through the sixth lines are scanned, for the three first image points, the synchronizer generates signals having state (1). Beginning with the fourth image point of the line, the signal having state (3) is connected. During scanning of the three first image points of the seventh line 53, the synchronizer instead generates a signal having the described state (2) after which the signal having state (3) is generated. After this come lines whose structure is the same as that of the above mentioned fourth through sixth lines. Switching between the different states is carried out after the same number of steps for each one of the transmissions, each of which is contained in the complete transmission of image material, in which the component images are to be brought into registration with each other. In this way, the reference marks will be placed in the correct positions, independent of the contents of the image, as long as the original image is not moved between transmissions.

The device can operate in two alternative fashions. The length and motion of the row scanner may be allowed to be such as to cover the entire surface within the line 45. The synchronizer thus moves the row scanner for scanning over this entire surface but does not connect the row scanner for modulation of transmission signal except when it is scanning within the image region 40. For the region outside the image region, the synchronizer instead produces signals having the states (1) and (2).

Alternatively, the row scanner can be arranged for scanning only of the image region 40 and, in this case, the synchronizer 71 is provided not to cause any movement or activation of the row scanner when generating signals representing the frame region. Instead, the synchronizer produces these signals independently without a corresponding movement of the row scanner.

The first alternative allows for adjustment of the apparatus for scanning the entire surface within the line 45 in order to create an image in those cases for which reference marks are not necessary. The second alternative provides for simpler equipment since the row scanner need not have a length which corresponds to the entire region within the line 45 nor a motion corresponding to this region but, rather, only corresponding to the image region itself.

The principle of the invention is applicable to other scanning devices and reproduction devices than those shown. Several types of such devices are known for one skilled in the art, and the ones shown have been choosen only as examples.

I claim:

1. A reference marking device for image transmitting devices, comprising: a receiver, and a transmitter for transmitting to the receiver a transmission signal comprising an image signal and first and second border reference signals, said transmitter comprising:

a transmission unit;

a scanner comprising a plurality of photosensors for repeatable optical scanning of an image as a sequence of image scan lines, and for generating the image signal in correspondence with the scanned image;

said image signal including a sequence of consecutive scan line signals, each corresponding to a respective image scan line;

signal generation means for electronically generating said first border reference signals including first reference mark signals at positions corresponding to first scan positions in a first scan direction, said first scan positions being invariant relative to a scan origin position, and for generating said second border reference signals including neutral reference signals and second reference mark signals;

said second border reference signals being generated between the consecutive scan line signals, said second reference mark signals being generated at positions corresponding to second scan positions in a second scan direction, said second scan positions being invariant relative to said scan origin;

scanner control and drive means for moving the scanner relative to the scanned image and for alternate activation and deactivation of said photosensors during generation of said image signal and said first and second border reference signals, respectively;

said receiver comprising image reproduction means for recording on an image base a reproduction of the scanned image in correspondence with the image signal; for recording on the image base a neutral border region corresponding to said first and second border reference signals and, in correspondence with the first and second reference mark signals, reference marks in the neutral border region; and for registration of a series of separate, associated image reproductions;

said reference marks being recorded in positions which are invariant relative to the content of the series of associated image reproductions and to the neutral border region, each of the associated image reproductions corresponding to a scanning of the image filtered with respect to color.

* * * * *